US006882905B2

(12) United States Patent
Hall et al.

(10) Patent No.: US 6,882,905 B2
(45) Date of Patent: Apr. 19, 2005

(54) BRAND REINFORCEMENT AND SERVICE LEVEL SUMMARY VIA WIRELESS LINK FOR IN-VEHICLE SYSTEMS

(75) Inventors: Todd H. Hall, Rochester, MI (US); Matt C. Videtich, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 127 days.

(21) Appl. No.: 10/242,207

(22) Filed: Sep. 12, 2002

(65) Prior Publication Data

US 2004/0054443 A1 Mar. 18, 2004

(51) Int. Cl.[7] .............................. G06F 7/00; H04Q 7/20

(52) U.S. Cl. ........................................ 701/1; 455/414.1

(58) Field of Search .............................. 701/1, 36, 200; 455/414.1, 410, 414; 340/5.9, 286.02

(56) References Cited

U.S. PATENT DOCUMENTS

2002/0052213 A1 * 5/2002 Ko et al. .................... 455/466

FOREIGN PATENT DOCUMENTS

WO WO 97/41654 * 11/1997 ............ H04H/1/00

* cited by examiner

*Primary Examiner*—Thu V. Nguyen
(74) *Attorney, Agent, or Firm*—Anthony Luke Simon

(57) ABSTRACT

The present invention provides a method for sending notification of an activation status of a telematics system. The mobile vehicle receives at least one activation status for the mobile vehicle. The mobile vehicle monitors for an activation status request signal and sends a notification of the activation status in response to the request.

19 Claims, 3 Drawing Sheets

200

BRAND REINFORCEMENT AND SERVICE LEVEL SUMMARY VIA WIRELESS LINK FOR IN-VEHICLE SYSTEMS

FIELD OF THE INVENTION

This invention generally relates to in-vehicle services. More particularly, the present invention relates to reinforcing a brand of in-vehicle service and sending notification of an activation status for the service.

BACKGROUND OF THE INVENTION

In-vehicle telematics systems are developing quickly in the complexity of their service offerings. One such telematics system already provides services dealing with air bag deployment notification, stolen vehicle tracking, remote door unlock, accident assistance, and route support, only to name a few.

The commercial service providers for in-vehicle telematics systems generally provide their services on a subscription basis. A variety of packages at different price levels may be available to the consumer. As is apparent in the list of services mentioned above, the user may very well be unaware of the existence of their telematics services unless a problem situation arises. A user might therefore forget about the service, or at least be less mindful of its existence. Given that the user must often make repeated payments to maintain their subscription, their lack of awareness or interaction with the system may negatively impact repeat subscription rates.

Difficulties may also arise relating to the plethora of available services and the various ways in which they are packaged. Currently, if a user forgets or has questions relating to what package they are currently operating under, or what services are included in the package, the primary means of finding answers is through interaction with a customer support representative. Staffing a call center is expensive, and any automation in providing information is thus strongly desirable. Simply listing the current package and services is a prime candidate for such automation. The telematics system itself may provide a much more effective and inexpensive platform for delivering package service level summary information.

It would be desirable to remind users of the existence of a telematics system thereby providing brand reinforcement in a manner that overcomes the above-described disadvantages. It would also be desirable to provide a method for delivering package service level summaries that overcomes the above-described disadvantages.

BRIEF SUMMARY OF THE INVENTION

One aspect of the invention presents a method for providing delivery of an activation status of a service package of a telematics system in a mobile vehicle. A telematics system in the mobile vehicle receives at least one activation status. The telematics system monitors for an activation status request signal. The telematics system then sends notification of the at least one activation status in response to the activation status request signal.

Another aspect of the invention presents a computer usable medium including a program for providing delivery of an activation status of a service package of a telematics system in a mobile vehicle. The program receives at least one activation status at the mobile vehicle. The program monitors for an activation status request signal at the mobile vehicle. The program then sends notification of the at least one activation status in response to the activation status request signal.

Another aspect of the invention presents a system for providing delivery of an activation status of a service package of a telematics system in a mobile vehicle including means for receiving at least one activation status at the mobile vehicle; means for monitoring for an activation status request signal at the mobile vehicle; and means for sending notification of the at least one activation status in response to the activation status request signal.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
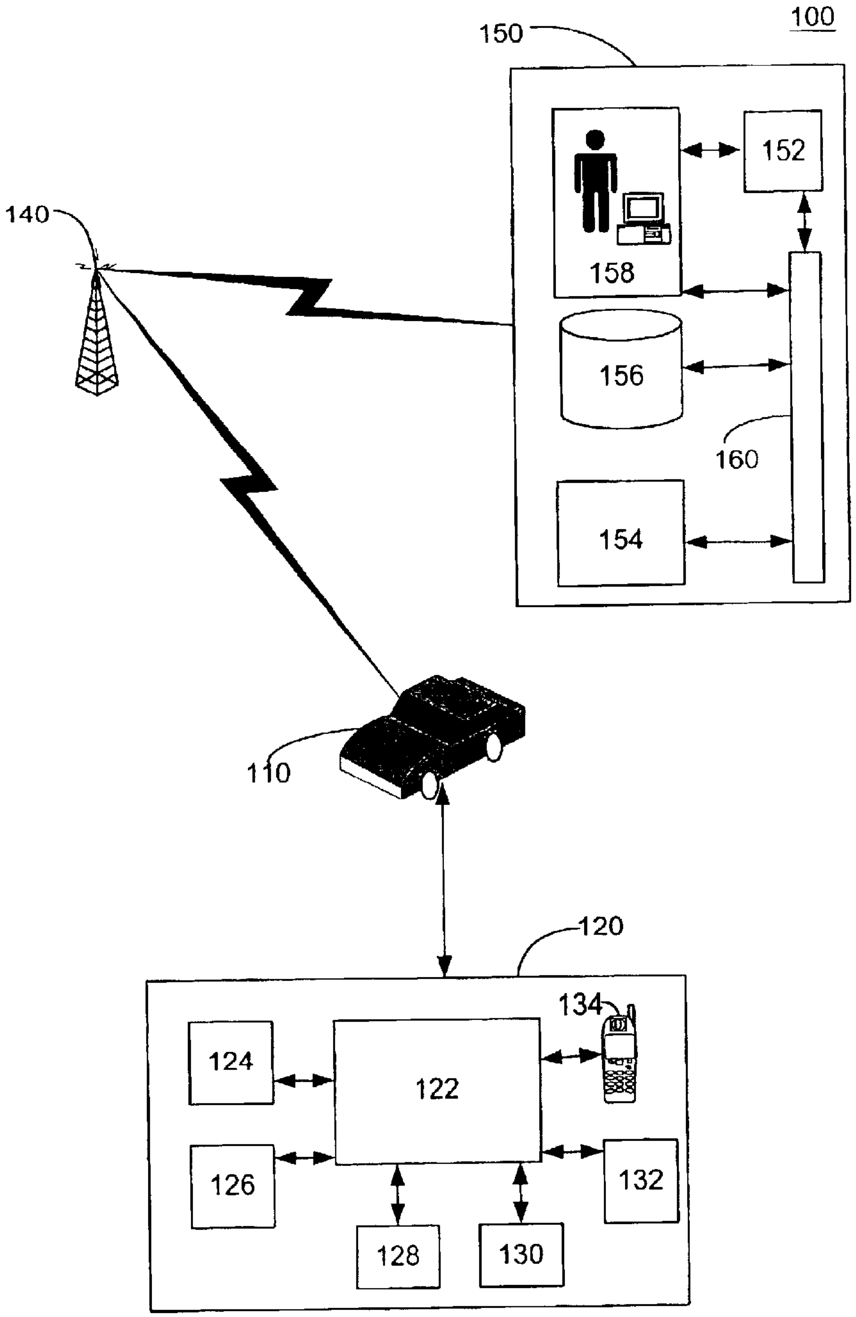
FIG. 1 is a block diagram illustrating one embodiment of a mobile vehicle communication system, in accordance with the present invention.

FIG. 1 illustrates one embodiment of a system for controlling wireless data transmissions, in accordance with the present invention, and may be referred to as a mobile vehicle communication system (MVCS) 100. MVCS 100 may include a mobile vehicle 110, a telematics system 120, one or more telematics service call centers 150, and a wireless carrier system 140.

Mobile vehicle 110 may be a vehicle equipped with suitable hardware and software for transmitting and receiving voice and data communications. Mobile vehicle 110 contains telematics system 120. Telematics system 120 may include a digital signal processor (DSP) 122 connected to a wireless analog, digital or dual-mode modem 124, a global positioning system (GPS) unit 126, an in-vehicle memory 128, a microphone 130, one or more speakers 132, and a network access device (NAD) or in-vehicle mobile phone 134. In-vehicle mobile phone 134 may be an analog, digital, or dual-mode cellular phone.

DSP 122 uses instructions and data from a computer usable medium that may contain various computer programs for controlling programming and operational modes within mobile vehicle 110. Digital signals are used to activate the programming mode and operation modes, as well as provide input and output data.

Telematics service call center 150 is a location where many calls may be received and serviced at the same time, or where many calls may be sent at the same time. The call center prescribes communications to and from mobile vehicle 110. Telematics service call center 150 may be a voice call center, providing verbal communications between an advisor in the call center and a subscriber in a mobile vehicle.

Telematics service call center 150 may contain one or more voice and data switches 152. Switch 152 transmits voice or data transmissions from call center 150. Switch 152 also may receive voice or data transmissions from telematics system 120 in mobile vehicle 110 through wireless carrier system 140, as is well known in the art. Switch 152 receives and sends data transmissions to and from one or more communication services managers 154 via one or more bus systems 160. Communication services manager 154 is any suitable combination of hardware and software capable of providing requested communication services to telematics system 120 in mobile vehicle 110. Communication services manager 154 may send to or receive from many different entities including one or more communication services databases 156, and one or more communication services advisors 158, all communicating via bus systems 160. Communication services advisor 158 is configured to receive from or send to switch 152 voice or data transmissions.

Wireless carrier system 140 is a wireless communications carrier such as a mobile telephone system. The mobile telephone system may be an analog mobile telephone system operating over a prescribed band nominally at 800 MHz. Alternatively, the mobile telephone system may be a digital mobile telephone system operating over a prescribed band nominally at 800 MHz, 900 MHz, 1900 MHz, or any suitable band capable of carrying mobile communications. Wireless carrier system 140 transmits to and receives signals from mobile vehicle 110. Wireless carrier system 140 may be connected with other communication and landline networks. Telematics service call center 150 may be connected to wireless carrier system 140 with a land-based network, a wireless network, or a combination of landline and wireless networks. In this manner, fully duplex communication is achieved between telematics service call center 150 and mobile vehicle 110.

In one example, mobile vehicle communication system (MVCS) 100 may be implemented as an OnStar system, as is known in the art, with regards to wireless communications between telematics service call center 150 and mobile vehicle 110.

Figure 2:
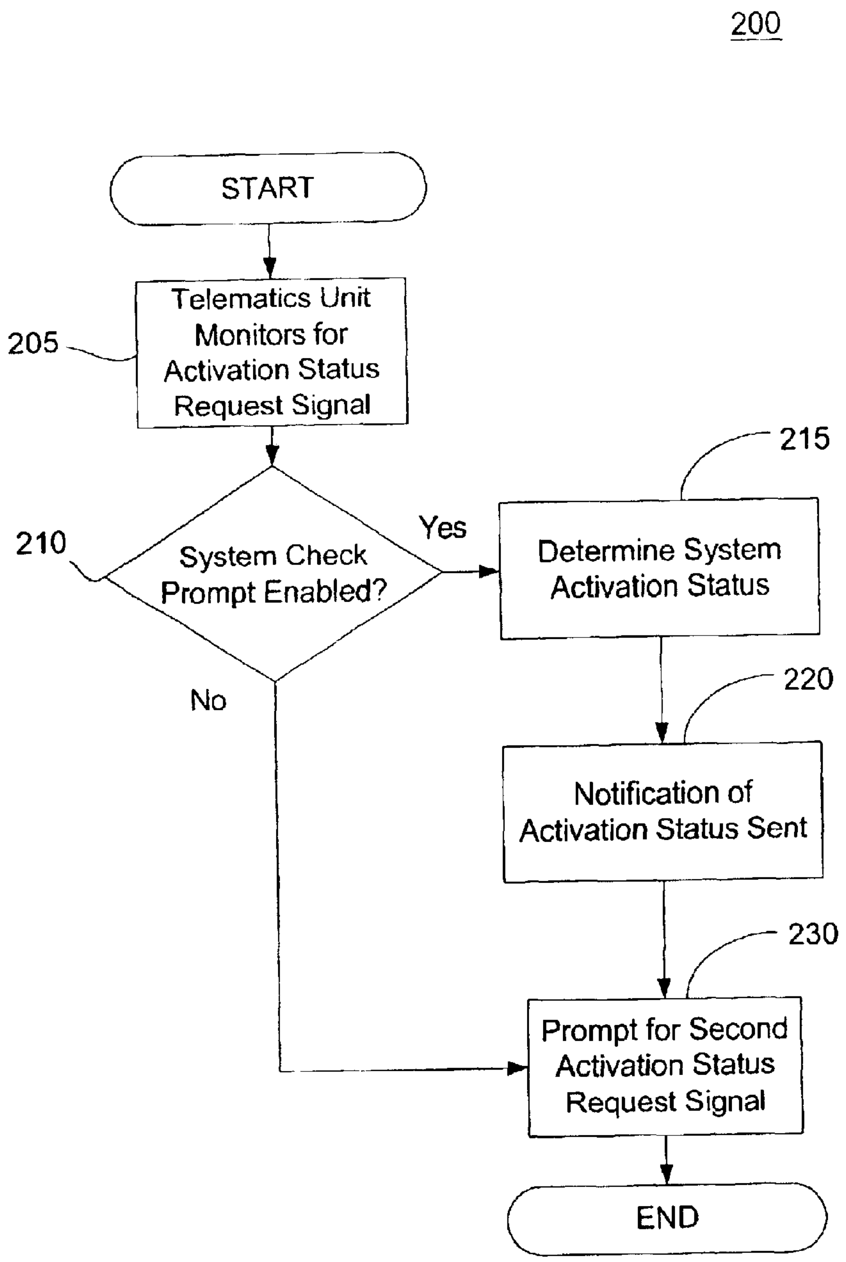
FIG. 2 is a flowchart representation of one embodiment of a process for sending notification of an activation status utilizing the system of FIG. 1, in accordance with the present invention.

FIG. 2 is a flowchart representation of one embodiment of the process for indicating the existence of MVCS 100 and associated telematics system 120 to a user of a mobile vehicle, in accordance with the present invention at 200. In order to make the user of mobile vehicle 110 aware of MVCS 100 and the activation status of telematics system 120, delivery of the activation status may take place. Accordingly, delivery may be initiated at various regularly scheduled times, or when certain events occur. An event or signal that may lead to delivery of the activation status is defined as an activation status request signal. In one embodiment, DSP 122 of telematics system 120 may be aware of various events and statuses of mobile vehicle 110 such as when the mobile vehicle is started, when the vehicle security alarm goes off, or a variety of other such events. While such vehicle-related events may be received as activation status request signals, the activation status request signal may alternatively be through user input such as pressing a button, or speaking a command that may be received by microphone 130.

The event of turning on mobile vehicle 110 may be signaled by, and described as, an engine start cycle. As previously stated, an engine start cycle is one example of an activation status request signal. In one embodiment, telematics system 120 may monitor for an engine start cycle, or some other activation status request signal in the mobile vehicle (Block 205) to initiate sending notification of the activation status.

When telematics system 120 detects an engine start cycle, or an alternative activation request signal, it may determine if the system check prompt is enabled (Block 210). In-vehicle memory 128 may store certain user preferences, including preferences regarding alerts, signals, and status updates delivered by telematics system 120. One such preference may be termed a system check prompt. The system check prompt allows the user to select whether they wish to hear activation status information about telematics system 120. If the system check prompt is enabled, it indicates that the telematics system 120 should deliver the system activation status. If the system check prompt is disabled, it indicates that notification of the system activation status should not be sent. The system check prompt may be enabled or disabled by the user. Alternatively, a communications services advisor 158 may perform enabling and disabling based upon, or independent of, user input.

If the system check prompt is enabled, telematics system 120 may conduct a self-assessment to determine its system activation status (Block 215). System activation status may be based upon an assessment of the state of the various components of telematics system 120, whether the subscription costs have been maintained for the telematics system, through a combination of these, or based on additional or alternative criteria. Information regarding the maintenance of subscription payments may be sent by call center 150, and optionally cached on the telematics system using in-vehicle memory 128. Once the system activation status has been determined, notification of the activation status may be sent to the user (Block 220). Notification may be achieved in a variety of ways. In one embodiment, notification may be sent via a visual display on the dashboard of mobile vehicle 110. In another embodiment, notification may be sent via in-vehicle speakers 132. For example, a message may be played such as, "Onstar safety and security system is active." In another embodiment, the determination of system activation status (Block 215) and notification of the status to the user (Block 220) may not occur every time an engine start cycle, or other activation status request signal, is detected. For example, these steps may only occur on every tenth or twentieth engine start cycle, or on the first engine start cycle within a certain period of time such as an hour, day or week.

If the system check prompt is disabled, or perhaps before or after notification of system activation status (Block 220), the user may be prompted for delivery of a second activation status request signal (Block 230). Prompting may be achieved in a manner similar to the notification of the system activation status—either by visual display or over speakers. In one embodiment, prompting for delivery of a second activation status request signal may be controlled by a user preference stored on telematics system 120. Delivery of the second activation status request signal may also be limited in a similar manner to the notification of system activation status. The prompt for delivery of a second activation status request signal may be provided on every tenth or twentieth engine start cycle, on the first engine start cycle within a certain period of time such as an hour, day or week. It may be delivered only in conjunction with the notification of activation status, or entirely independently. In one embodiment the system check prompt may control both the notification of system activation status and the prompt for delivery of a second activation status request signal.

Figure 3:
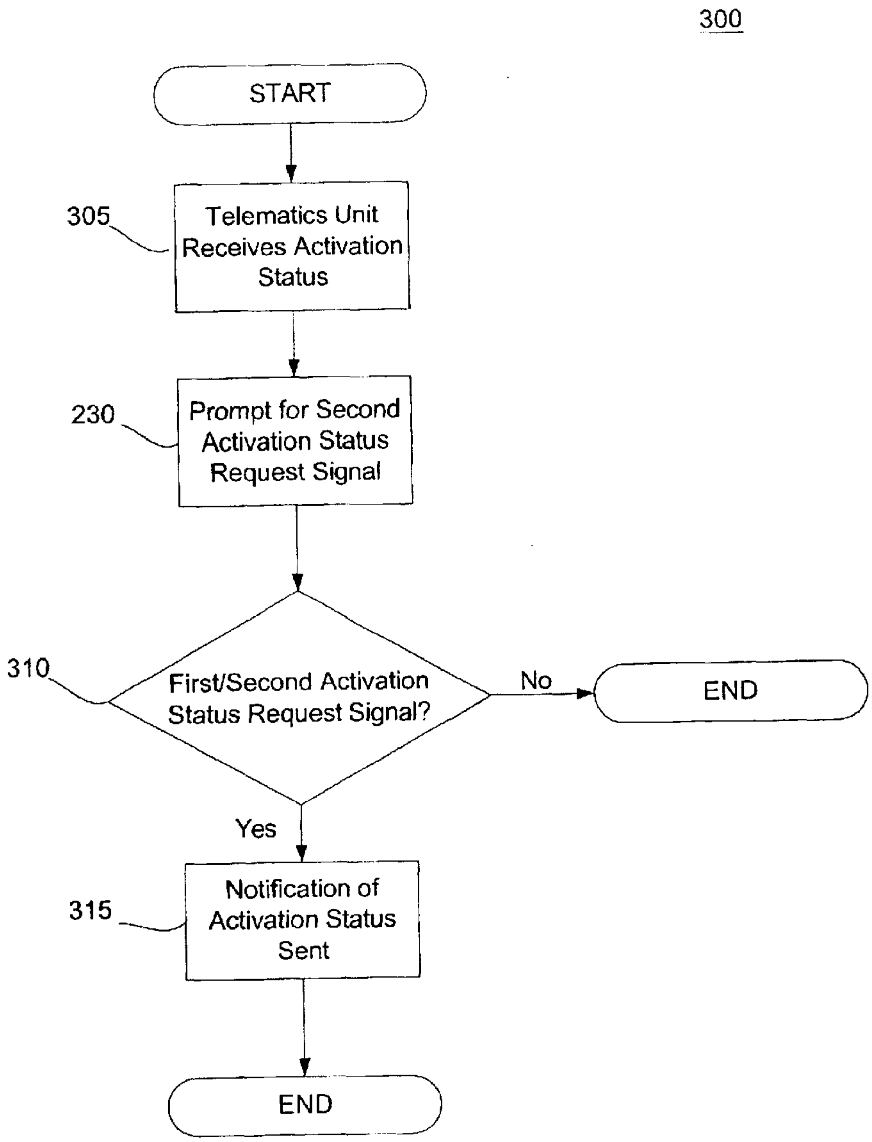
FIG. 3 is a flowchart representation of an alternative embodiment of a process for sending notification of an activation status utilizing the system of FIG. 1, in accordance with the present invention.

FIG. 3 is a flowchart representation of an alternative embodiment of a process for sending notification of an activation status. MVCS 100 may offer a wide variety of services and service packages. In one embodiment, notification of an activation status may be provided including a description of the current services and packages associated with telematics system 120. An activation status notification including such information, in addition to providing indication of the presence of the system, may be defined as a service level summary. Telematics service call center 150 holds information in communication services databases 156 relating to the services and packages enabled for each telematics system 120 in MVCS 100. This information may be stored as a package service level summary. A package service level summary may be an activation status that includes an indication of the services associated with a particular package. In one embodiment, a package service level summary may be in the form of a wav or mpeg file that when played describes the services associated with a package. Alternatively, a package service level summary may be a text description of the services associated with a package. More generally, a package service level summary is a description of an activation status that includes data representing in some manner the existence of, availability of, current subscription status to, or the absence of some service or service package defined on MVCS 100. In one embodiment, one or more package service level summaries may be stored on in-vehicle memory 128. Some portion of the one or more package service level summaries may be provided with the telematics system 120 initially. Some or all information relating to an activation status, in one embodiment in the form of a package service level summary, may at some point be sent from telematics service call center 150 via switch 152 and received at mobile vehicle 110 by modem 124 (Block 305). The service level summary is then stored on in-vehicle memory 128. Telematics unit 120 then awaits an activation status request signal (Block 310). As is represented in FIG. 3, the activation status request signal may be preceded by a prompt for delivery of a second activation status request signal (Block 220), as was described previously in FIG. 2.

The first or second activation status request signal may be received in the form of user input such as pressing a button one or more times, or by the user issuing a command that is received by microphone 130. For example, the prompt for delivery of a second activation status request signal might be an audible prompt such as, "Press the Onstar button twice to receive a current service level summary," in which case the second activation status request signal would be in the form of pressing the button twice. Alternatively, after a prompt or at any other time the user may be able to speak a command, or press a button and then speak a command such as, "Tell me my service package." In another embodiment, an activation status request signal may be received remotely by the telematics system 120, either sent by the user or from telematics service call center 150. Any of these, or some other alternative means of providing input as known in the art, may be defined as an activation status request signal, or a second activation status request signal.

Upon reception of an activation status request signal, or a second activation status request signal, the package service level summary may be provided (Block 315). The package service level summary may be provided via a visual display on the dashboard of mobile vehicle 110. In another embodiment the package service level summary may be delivered via in-vehicle speakers 132.

In one embodiment, a variety of package service level summaries may be associated with a single telematics system 120. This is a very likely scenario in that a variety of packages may be available, each package having a service level summary that could be assigned to it. The user may be subscribed or have access to more than one of these packages. In this event, the package service level summary provided in response to the first or second activation status request signal may be a single package service level summary, several service level summaries, or a complete telematics system service level summary. In one embodiment, a predetermined template may be provided on telematics system 120. The information relating to the predetermined template may be stored on in-vehicle memory 128 and may be processed by DSP 122 as is known in the art. The function of the predetermined template is to store one or more package service level summaries. For example, the predetermined template may store wav files or mpeg files associated with each service package. In one embodiment, the predetermined template stores only information relating to service packages currently subscribed to, active, or available on telematics system 120. Alternatively, the predetermined template may store information relating to all possible service packages. When a request for a package service level summary is received, the information relating to the requested service package or collection of service packages may be retrieved from the predetermined template and delivered to the user. If information is stored on the predetermined template other than only the services subscribed to or active on telematics system 120, the user may request information relating to service packages they do not yet have. Alternatively, the template may only provide information relating to service packages subscribed to or active on the telematics system 120.

The above-described methods and implementation for indicating the existence of a telematics system and providing package service level summaries are example methods and implementations. These methods and implementations illustrate one possible approach for indicating the existence of a telematics system and providing package service level summaries. Moreover, various other improvements and modifications to this invention may occur to those skilled in the art, and those improvements and modifications will fall within the scope of this invention as set forth below.

While embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method for sending notification of an activation status of a service package of a telematics system in a mobile vehicle, comprising:

receiving at least one activation status at the mobile vehicle, the activation status including a telematics system service level summary;

monitoring for an activation status request signal at the mobile vehicle; and sending a notification of the at least one activation status in response to the activation status request signal.

2. The method of claim 1 wherein receiving the at least one activation status at the mobile vehicle comprises storing the at least one activation status in a predetermined template.

3. The method of claim 2 wherein the predetermined template stores a plurality of activation statuses, each of the plurality of activation statuses relating to a different service package.

4. The method of claim 1 wherein a complete telematics system activation status summary is delivered in response to activation status request signal.

5. The method of claim 1 wherein the activation status request signal comprises pressing a button.

6. The method of claim 1 wherein the activation status request signal comprises an audible request from the user of the mobile vehicle.

7. The method of claim 1 wherein the activation status request signal comprises an engine start cycle.

8. The method of claim 1 wherein sending a notification of the at least one activation status is made based upon a system check prompt.

9. The method of claim 1 wherein the delivery of the activation status includes a prompt for a second activation status request signal.

10. A computer usable medium including a program for sending notification of an activation status of a service package of a telematics system in a mobile vehicle, comprising:

computer program code to receive at least one activation status at the mobile vehicle from a call center, the activation status including a telematics system service level summary;

computer program code to monitor for an activation status request signal at the mobile vehicle; and computer program code to send a notification of the at least one activation status in response to the activation status request signal.

11. The computer usable medium of claim 10 wherein receiving the at least one activation status at the mobile vehicle comprises storing the at least one activation status in a predetermined template.

12. The computer usable medium of claim 11 wherein the predetermined template stores a plurality of activation statuses, each of the plurality of activation statuses relating to a different service package.

13. The computer usable medium of claim 10 wherein a complete telematics system activation status summary is delivered in response to the activation status request signal.

14. The computer usable medium of claim 10 wherein the activation status request signal comprises pressing a button.

15. The computer usable medium of claim 10 wherein the activation status request signal comprises an audible request from the user of the mobile vehicle.

16. The computer usable medium of claim 10 wherein the activation status request signal comprises an engine start cycle.

17. The computer usable medium of claim 10 wherein sending a notification of the at least one activation status is made based upon a system check prompt.

18. The computer usable medium of claim 10 wherein the delivery of the activation status includes a prompt for a second activation status request signal.

19. A system of sending notification of an activation status of a service package of a telematics system in a mobile vehicle, comprising:

means for receiving at least one activation status at the mobile vehicle, the activation status including a telematics system service level summary;

means for monitoring for an activation status request signal at the mobile vehicle; kind means for sending a notification of the at least one activation status in response to the activation status request signal.

* * * * *